(No Model.)
D. HOUGHTON.
WIRE CUTTING MACHINE.
No. 299,791. Patented June 3, 1884.
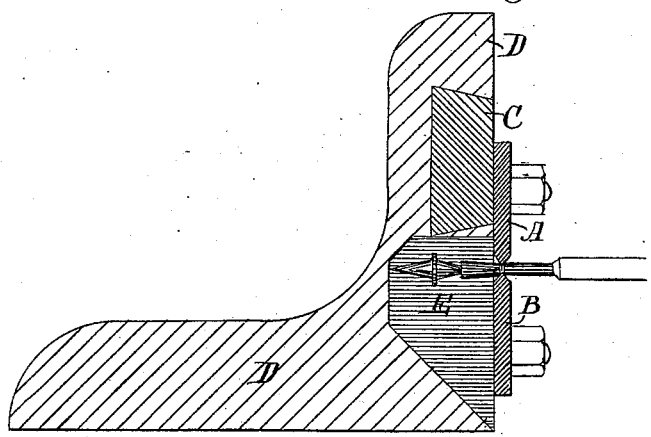
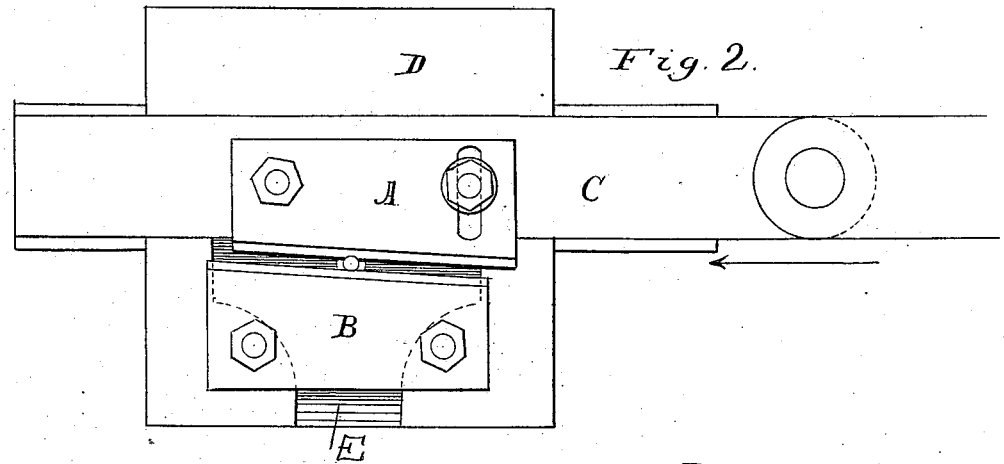
Witnesses:
J. D. Maxfield
L. L. Morrill
Inventor:
Darius Houghton
by S. W. Bates
his atty

UNITED STATES PATENT OFFICE.

DARIUS HOUGHTON, OF SKOWHEGAN, MAINE.

WIRE-CUTTING MACHINE.

SPECIFICATION forming part of Letters Patent No. 299,791, dated June 3, 1884.

Application filed February 18, 1884. (No model.)

*To all whom it may concern:*

Be it known that I, DARIUS HOUGHTON, a citizen of the United States, residing at Skowhegan, in the county of Somerset and State of Maine, have invented certain new and useful Improvements in Wire-Cutting Machines, of which the following is a specification, reference being had therein to the accompanying drawings.

The object of my invention is to provide a machine for cutting wire, so as to leave a finished end of any regular shape; and it is particularly designed for cutting boot-calks from the end of the steel wire on which they have been formed, so that the end of the calk shall be smoothly pointed and ready for driving. I accomplish this result by means of the machinery shown in the accompanying drawings, in which—

Figure 1 is a side elevation. Fig. 2 is a section through line $x$ $x$ of Fig. 1.

A is a cutter having its lower edge beveled to form a cutting-edge. It is secured to the traveling bar C by two screws, one of which passes through a slot in the cutter A, so placed as to allow one end of the cutter to be adjusted vertically. The bar C moves in slides in the bed-piece D.

B is a stationary cutter having a cutting-edge similar to and exactly opposite the edge of cutter A. Cutter B is secured to the bed-piece D by means of screws. A hollow space, E, is left in the bed-piece D behind the cutter B, of sufficient depth to receive the calk to be cut off. The cutting-edges of cutters A and B are parallel to each other when adjusted; but they are placed at an angle with the axis of motion of the cutter A, so that as the latter moves back and forth the cutting-edges will approach to and recede from each other. The bar C has a reciprocal motion imparted to it by a crank or other suitable means, and its motion is so adjusted that when at the end of its stroke the cutters A and B will be together, or nearly so.

When the machine is to be used, the calk or other wire is placed between the cutting-edges when they are far enough apart to admit it. As the edges approach each other, the wire is gradually rolled and cut off, leaving a smoothly-finished end. The calk being cut drops behind the cutter B. Both cutters might have an opposite reciprocal motion. Hitherto such calks have been sheared off after being forged, and the rough edges thus left were ground off by hand on an emery-wheel.

By the use of my machine the ends are finished and ready for shipping when they come from the machine.

I claim as my invention—

The combination of a fixed and a movable cutter arranged with their cutting-edges opposite and parallel and at an angle to the line of motion of the movable cutter, the movable cutter being arranged to move lengthwise along the face of the other cutter and to meet it, as and for the purpose set forth.

In testimony whereof I affix my signature in presence of two witnesses.

DARIUS HOUGHTON.

Witnesses:
   H. D. BATES,
   S. W. BATES.